United States Patent
Fried (10) Patent No.: US 11,573,782 B2
(45) Date of Patent: Feb. 7, 2023

(54) SELF UPDATING AGENT

(71) Applicant: Red Hat, Inc., Raleigh, NC (US)

(72) Inventor: Eric Phillip Fried, Austin, TX (US)

(73) Assignee: Red Hat, Inc., Raleigh, NC (US)

(*) Notice: Subject to any disclaimer, the term of this patent is extended or adjusted under 35 U.S.C. 154(b) by 0 days.

(21) Appl. No.: 17/142,815

(22) Filed: Jan. 6, 2021

(65) Prior Publication Data

US 2022/0214869 A1 Jul. 7, 2022

(51) Int. Cl.
G06F 8/65 (2018.01)
G06F 8/71 (2018.01)

(52) U.S. Cl.
CPC . *G06F 8/65* (2013.01); *G06F 8/71* (2013.01)

(58) Field of Classification Search
CPC .................................... G06F 8/65; G06F 8/71
See application file for complete search history.

(56) References Cited

U.S. PATENT DOCUMENTS

| | | | |
|---|---|---|---|
| 6,167,567 A | 12/2000 | Chiles et al. | |
| 8,839,221 B2 | 9/2014 | Sapuntzakis et al. | |
| 9,032,383 B2 | 5/2015 | D'Aurelio et al. | |
| 10,146,520 B1* | 12/2018 | Hillyard | G06F 8/65 |
| 2008/0301669 A1* | 12/2008 | Rao | G06F 8/65 717/173 |
| 2011/0173598 A1* | 7/2011 | Cassapakis | G06F 8/654 717/168 |
| 2013/0283254 A1* | 10/2013 | Ocher | G06F 8/65 717/170 |
| 2015/0067665 A1* | 3/2015 | Thomas | G06F 8/60 717/168 |

FOREIGN PATENT DOCUMENTS

| | | |
|---|---|---|
| CN | 110647344 | 1/2020 |
| CN | 111427609 | 7/2020 |
| CN | 111596942 | 8/2020 |

OTHER PUBLICATIONS

Using the API Updater, https://docs.unity3d.com/Manual/APIUpdater.html; Using the API Updater 2020—Unity Technologies 2020 Publication Date: 2020; retrieved on or before Nov. 12, 2020 (6 pages).
Auto Update: A GitHub Enabled Auto updater, honey the odewitch, https://www.codeproject.com/Articles/5165015/AutoUpdate-A-GitHub-Enabled-autoupdater; Aug. 19, 2019 CPOL; retrieved on or before Nov. 12, 2020 (3 pages).

* cited by examiner

*Primary Examiner* — Daxin Wu
(74) *Attorney, Agent, or Firm* — K&L Gates LLP (57) ABSTRACT

A system includes a server comprising a memory and a processor, where the processor is in communication with the memory. The processor is configured to download, by the updating agent, a second version of source files associated with a second version of the updating agent, where the second version of source files are stored separately from the first version of the source files, where the second version of the updating agent is operable to update a second set of libraries of the application. Next, the updating agent overwrites the first version of the source files with the second version of the source files. The updating agent then re-starts the updating agent with an update parameter designating a location of the downloaded second version of the source files, wherein the third version of the source files are executed to re-start the updating agent.

20 Claims, 4 Drawing Sheets

SELF UPDATING AGENT

BACKGROUND

Computer systems may run applications or services that are provided via a server or cloud. The applications or services can be developed and deployed at runtime. Application instances or services may run within containers, which may be run on physical or virtual machines. The containers may be used to separate various components of a computing system. For example, different components of a computing system may be executed in different containers and/or virtual machines executing on a computing device or multiple computing devices. Maintenance and/or modifications to installed services and/or applications may often be applied in various server or cloud environments which may be continuously evolving.

SUMMARY

The present disclosure provides new and innovative systems and methods for an updating agent to update itself to a latest version before updating a software system. In an example, a system includes a server comprising a memory and a processor, where the processor is in communication with the memory, the server comprises an updating agent executing on the server, the updating agent comprises a first version of source files, and the updating agent is operable to update a first set of libraries of an application and the updating agent. The processor is configured to download, by the updating agent, a second version of source files associated with a second version of the updating agent, where the second version of source files are stored separately from the first version of the source files, where the second version of the updating agent is operable to update a second set of libraries of the application. Next, the updating agent overwrites the first version of the source files with the second version of the source files, where the overwritten first version of the source files becomes a third version of the source files which is identical to the second version of the source files. Next, the updating agent re-starts the updating agent with an update parameter designating a location of the downloaded second version of the source files, wherein the third version of the source files are executed to re-start the updating agent.

In an example, a method includes downloading, by an updating agent comprising a first version of source files, a second version of source files associated with a second version of the updating agent, where the second version of source files are stored separately from the first version of the source files, the updating agent is operable to update a first set of libraries of an application and the updating agent, and the second version of the updating agent is operable to update a second set of libraries of the application. Next, the updating agent overwrites the first version of the source files with the second version of the source files, wherein the overwritten first version of the source files becomes a third version of the source files which is identical to the second version of the source files. The updating agent then re-starts the updating agent with an update parameter designating a location of the downloaded second version of the source files, wherein the third version of the source files are executed to re-start the updating agent.

In an example, a non-transitory machine readable medium storing code, which when executed by a processor is configured to download, by an updating agent comprising a first version of source files, a second version of source files associated with a second version of the updating agent, where the second version of source files are stored separately from the first version of the source files, the updating agent is operable to update a first set of libraries of an application and the updating agent, and the second version of the updating agent is operable to update a second set of libraries of the application. Next, the updating agent overwrites the first version of the source files with the second version of the source files, wherein the overwritten first version of the source files becomes a third version of the source files which is identical to the second version of the source files. The updating agent then re-starts the updating agent with a signal indicating the overwrite is complete, wherein the third version of the source files are executed to re-start the updating agent.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Techniques are disclosed for providing a capability for an update agent to update itself and handle updating applications, libraries, and/or drivers to their latest available versions. Generally, a software system requires regular updates to remain current with critical patches (e.g., security patches, bug fixes) and to gain access to new functionality of the software system (e.g., new and/or updated libraries having additional functionality). Typically, updating software is a complex process often requiring knowledge of local hardware and software to determine what needs to be updated and how to update it. Conventionally, updating software requires determining a state of current software, whether the current software is upgradeable to a latest version, determining where the new versions of software and associated libraries are located, downloading relevant software packages, and executing installers and/or updaters to update a software system to a latest version.

As described in various examples disclosed herein, to facilitate simplifying acquiring and/or implementing software updates for a software system, the systems and methods disclosed herein advantageously provide the capability for an executing update agent to update itself prior to updating applications, libraries, and/or drivers on a system automatically. In most implementations, an update agent may be able to discover its current state and may be able to update software associated with the update agent or the update agent itself to become fully functional. Executing a fully functional updating agent is vital, as previous version of an updating agent may not be aware of recent updates to a software system. An update agent may determine whether the updating agent itself is up to date with a latest version of the updating agent. If an updating agent has not yet been updated, the update agent may locate and download source files (e.g., source code, executable scripts, executables, etc.) to update the update agent's own source files. Upon updating its own source files, an update agent may restart itself and continue to update applications, libraries, and/or drivers associated with the update agent. In some implementations, an updating agent may recompile its own source files. In other implementations, the source files may be executable files (e.g., binaries or executable scripts). In certain implementations, source files may be and/or include data files modifying functionality of an updating agent. In most instances, an update agent does not require knowledge of which version of software is being upgraded nor any details related to changed/expanded functionality of the software to upgrade the software.

Figure 1:
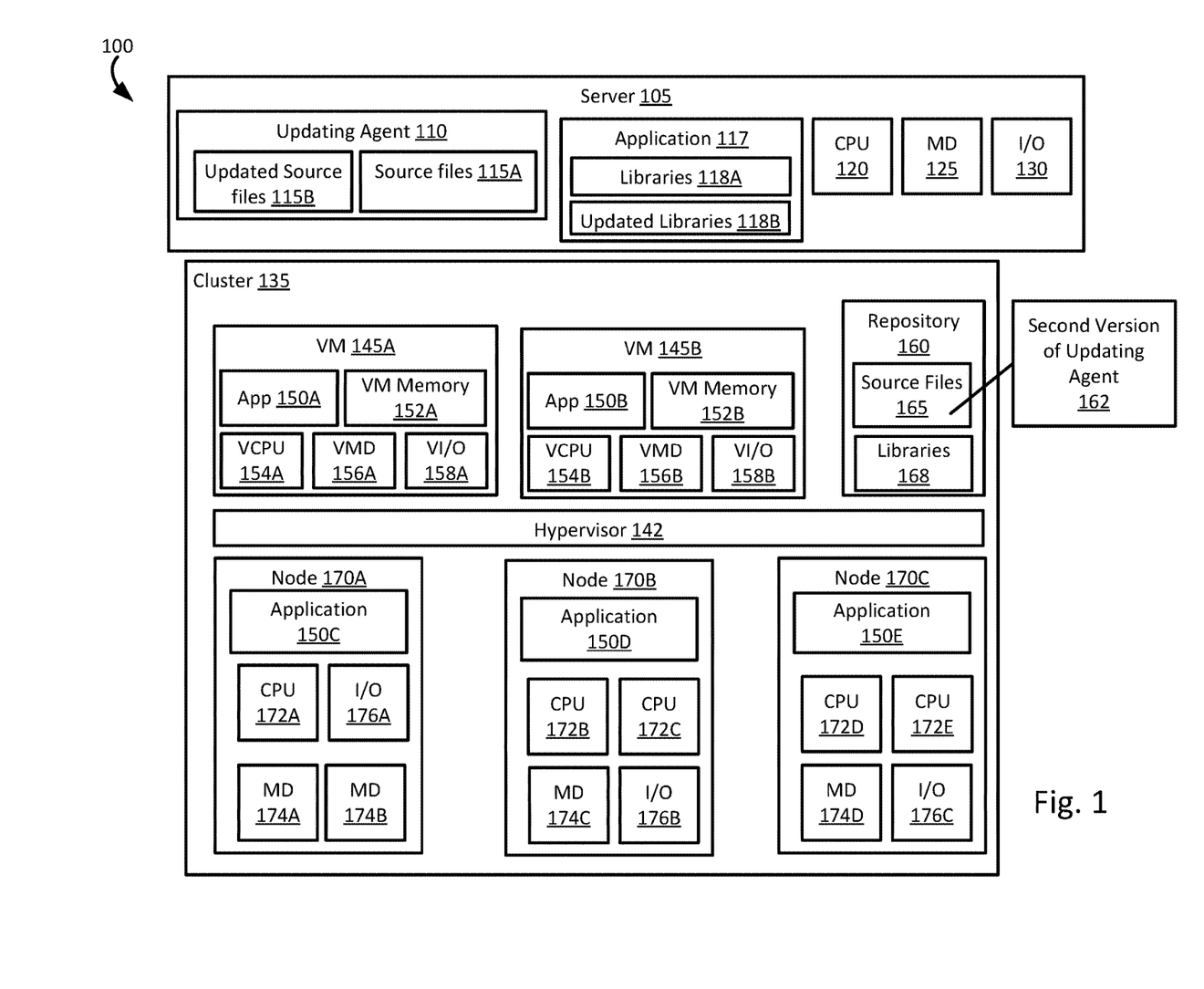
FIG. 1 illustrates a high level component diagram of an example computing system in accordance with one or more aspects of the present disclosure.

FIG. 1 depicts a high-level component diagram of an example computing system 100 in accordance with one or more aspects of the present disclosure. The computing system 100 may include a server 105 and a cluster 135. The cluster may include a repository 160, one or more virtual machines (VM 134A-B, 145 generally), and nodes (e.g., nodes 170A-C, 170 generally). The cluster 135 may include a hypervisor 142, which may create and/or run the VMs 145. As shown in FIG. 1, applications (150A-D, 150 generally) may be executed on various devices within the cluster (e.g., VMs 145 and/or nodes 170). In an example, Applications 150A-D may be different applications or services executing within cluster 135. In another example, applications 150A-D may be different instances of the same application or service executing within cluster 135.

As shown in FIG. 1, server 105 may include CPU 120, memory device 125, and input/output devices (I/O) 130. The server 105 may be operable to execute an application 117 and updating agent 110. An application 117 may include one or more libraries (e.g., libraries 118A) that may require an update to a latest version (e.g., updated libraries 118B). In various implementations, an application 117 may be an application, service, library, driver, and/or other software execution on a server. For example, in one instance, application 117 may be data replication service executing on the server 105 operable to replicate data from the server 105 to an external storage system. In various implementations, an application 117 may be associated with an updating agent 110 operable to update the application 117 and/or libraries 118A. In some instances, an updating agent 110 may comprise source files 115A. In certain examples, a source file may include source code, executable scripts, and/or input files to support updating the updating agent 110, application 117 and/or libraries 118A.

During execution, an updating agent 110 may be operable to retrieve updates associated with the application 117 and/or the updating agent 110 itself. The updating agent 110 may update source files 115A with the source files 165 to upgrade the updating agent 110 to the second version of the updating agent 162. For example, an updating agent (e.g., updating agent 110) may not include executable scripts and/or functionality to address installing a new version of an application (e.g., application 117). The new version of the application may require installing additional libraries 168 (e.g., a library capable of handling new types of transaction protocols) and/or previously non-existent libraries 168 (e.g., functionality of application 117 expanded to include inline encryption technology). Upon execution of the updating agent 110, the updating agent 110 may request and/or download source files 165 from a repository 160 to update itself to a newer version of the updating agent (e.g., second version of updating agent 162) which may include data, additional libraries, and/or locations of libraries required to update the application. The repository 160 may be installed and/or stored on a VM (e.g., VMs 145) and/or a node (e.g., nodes 170) within the cluster 135. In this example, the updating agent 110 does not need information related to which version of the updating agent 110 is executing nor which version of the application 117 is installed on server 105. In some instances, any version of the updating agent 110 may be capable of updating an application 117 after updating itself. In various implementations, an updating agent (e.g., updating agent 110) may be located on a same system (e.g., server 105, cluster 135, VM 145) as a repository (e.g., repository 160) and an application (e.g., application 117). In other implementations, an updating agent 110, application 117, and repository 160 may be located on various combinations of servers, clusters, nodes, VMs, and/or other computing devices.

As shown in FIG. 1, virtual machines (e.g., VMs 145A-B) may include a virtual machine memory (VM Memory), a virtual CPU (VCPU), virtual memory devices (VMD), and virtual input/output devices (VI/O). For example, virtual machine 145A may include virtual machine memory 152A, a virtual CPU 154A, a virtual memory devices 156A, and a virtual input/output device 158A. Similarly, virtual machine 145B may include virtual machine memory 152B, a virtual CPU 154B, a virtual memory devices 156B, and virtual input/output device 158B.

In an example, a virtual machine 145A may execute a guest operating system and run applications 150A which may utilize the underlying VCPU 154A, VMD 156A, and VI/O device 158A. One or more applications 150A-B may be running on a virtual machines 145A and 145B under the respective guest operating system. A virtual machine (e.g., VM 145A-B, as illustrated in FIG. 1) may run on any type of dependent, independent, compatible, and/or incompatible applications on the underlying hardware and operating system ("OS"). In an example, applications (e.g., App 150A) run on a virtual machine 145A may be dependent on the underlying hardware and/or OS. In another example embodiment, application 150A running on a virtual machine 145A may be independent of the underlying hardware and/or OS. For example, application 150A running on a first virtual machine 145A may be dependent on the underlying hardware and/or OS while applications (e.g., application 150B) run on a second virtual machine (e.g., VM 145B) are independent of the underlying hardware and/or OS. Additionally, an application 150A running on a virtual machine 145A may be compatible with the underlying hardware and/or OS. In an example embodiment, applications 150A run on a virtual machine 145A may be incompatible with the underlying hardware and/or OS. For example, applications 150A run on one virtual machine 145A may be compatible with the underlying hardware and/or OS while application 150B run on another virtual machine 145B is incompatible with the underlying hardware and/or OS.

In an example, virtual machines 145A-B may instead be containers that execute applications or services, such as microservices. In an example, the containers may each run a process or service and the containers may be any execution environment. For example, the containers may be a virtual server. It should be appreciated that containers may be stand alone execution environments, similar to that of a virtual machine. The applications 150A-D or services (e.g., microservices) may run in a software container, node (e.g., 170A-C), or a virtual machine (e.g., virtual machines 145A).

The computer system 100 may include one or more nodes 170A-C. Each node 170A-C may in turn include one or more physical processors (e.g., CPU 172A-E) communicatively coupled to memory devices (e.g., MD 174A-D) and input/output devices (e.g., I/O 176A-C). Each node 170A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 145A-B may be provisioned on the same host or node (e.g., node 170A) or different nodes. For example, VM 145A and VM 145B may both be provisioned on node 170A. Alternatively, VM 145A may be provisioned on node 170A while VM 145B is provisioned on node 170B.

As used herein, physical processor or processor 172A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 174A-D refers to a volatile or non-volatile memory device, such as RAM, ROM, EEPROM, or any other device capable of storing data. As discussed herein, I/O device 176A-C refers to a device capable of providing an interface between one or more processor pins and an external device capable of inputting and/or outputting binary data.

Processors (e.g., CPUs 172A-E) may be interconnected using a variety of techniques, ranging from a point-to-point processor interconnect, to a system area network, such as an Ethernet-based network. Local connections within each node, including the connections between a processor 172A-E and a memory device 174A-D may be provided by one or more local buses of suitable architecture, for example, peripheral component interconnect (PCI).

Figure 2:
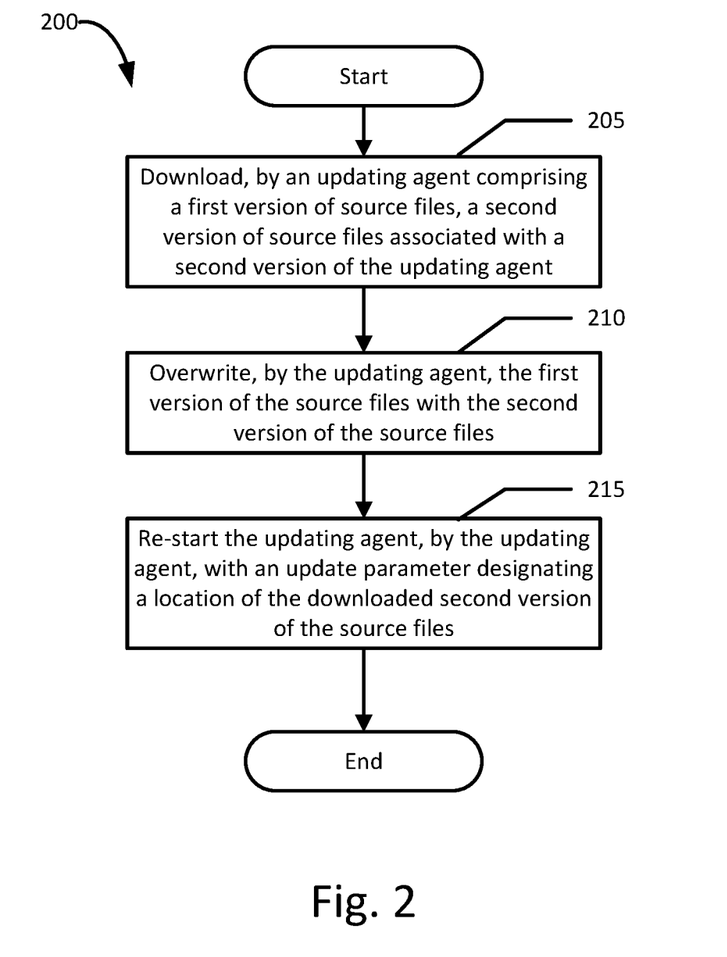
FIG. 2 illustrates a flowchart of an example method of executing an update agent in accordance with one or more aspects of the present disclosure.

FIG. 2 illustrates a flowchart of an example method of executing an update agent, in accordance with an embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated and some of the blocks described are optional. The method 200 may be performed by processing logic that may comprise hardware (circuitry, dedicated logic, etc.), software, or a combination of both.

As shown in FIG. 2, an example method 200 may begin with downloading, by an updating agent comprising a first version of source files, a second version of source files associated with a second version of the updating agent (block 205). In various implementations, the second version of the source files are stored separately from the first version of the source files. In some instances, an updating agent is operable to update a first set of libraries of an application and the updating agent itself. In certain implementations, a second version of an updating agent is operable to update a second set of libraries of an application. For example, an updating agent 110 may be associated with a mathematical modeling application (e.g., application 117), where the latest version of the mathematical modeling application has increased functionality (e.g., the latest version of the software may include interface libraries associated with a chipset previously non-existent). In this example, the updating agent 110 comprises a plurality of executable scripts associated with an older version of the mathematical modeling application. Upon execution of the updating agent 110, the updating agent 110 downloads, from a repository 160, source files 165 associated with a second version of the updating agent 162. In this example, the second version of the updating agent 162 includes information related to the latest version of the application 117 (e.g., a latest updating agent may include information about additional libraries, where the libraries may be downloaded from, and/or how install the libraries). The updating agent 110 downloads the source files 165 to a temporary location separate from the first version of source files 115. In various implementations, a temporary location may include a separate directory. In certain implementations, executable scripts may include shell scripts operable to execute commands via a command line interface.

Next, the example method 200 may include overwriting, by the updating agent, the first version of the source files with the second version of the source files (block 210). The overwritten first version of the source files becomes a third version of the source files which are identical to the second version of the source files. For example, once the source files 165 are downloaded, the updating agent 110 overwrites source files 115A with the locally stored source files 165 to create the updated source files 115B. The updated source files 115B are identical to source files 165. For example, an updating agent 110 may execute a directory copy to overwrite source files 115A associated with the updating agent 110. In another example, an updating agent 110 may compile the source files 165 and copy them into an execution path and/or directory. Next, the example method 200 may include re-starting the updating agent, by the updating agent, with an update parameter designating a location of the downloaded second version of the source files (block 215). In this instance, the updating agent executes a third version of the source files when re-starting the updating agent. For example, the updating agent 110 may restart itself (e.g., the updating agent 110 may fork a process and exit the original process gracefully) with an update parameter indicating a local location of the source files 165, where the newly re-started updating agent 110 is executing from the updated source files 115B. In various implementations, the restarted updating agent 110 may be operable to update libraries 118A and/or generate updated libraries 118B from libraries 168 stored within the repository 160. In some instances, updated libraries 118B may be a subset of libraries 118A. In other instances, updated libraries 118B may include libraries 118A. In certain instances, the updated libraries 118B may be an entirely new implementation of the libraries 118A.

Figure 3:
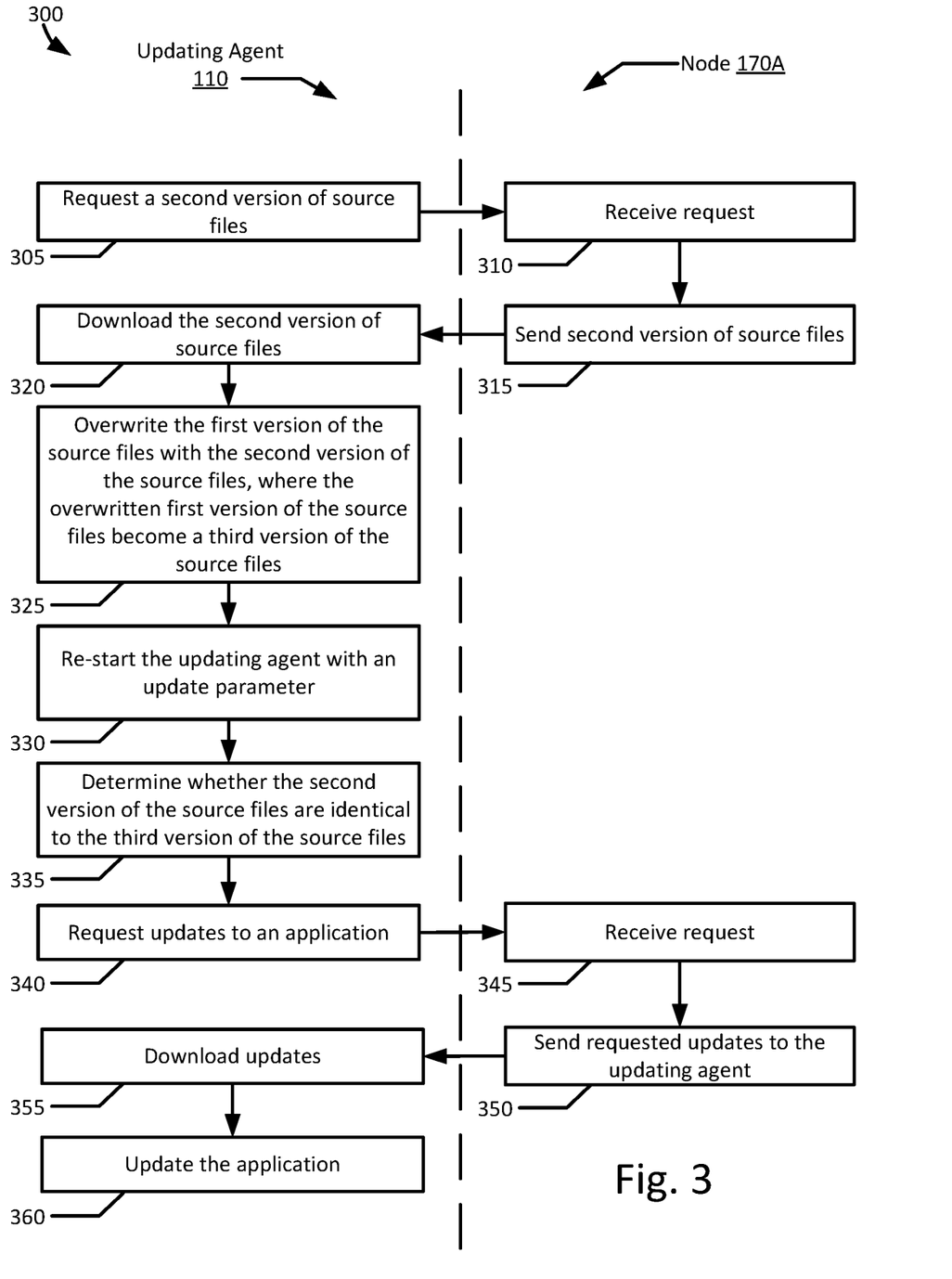
FIG. 3 illustrates a flow diagram of example methods of executing an update agent in accordance with an embodiment of the present disclosure.

FIG. 3 illustrates a flow diagram of an example methods of an updating agent updating itself and an associated application, in accordance with an embodiment of the present disclosure. Although the example method 300 is described with reference to the flow diagram illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. For example, in the illustrated flow diagram, an updating agent 110 executing on a server 105 is in communication with repository 160 on node 170A, where the source files 165 are located within the repository 160.

As shown in FIG. 3, the updating agent 110 is invoked to update the application 117 (e.g., a web server) also executing on server 105. In this example, the repository 160 is stored within node 170A, where the repository stores source files 165 associated with a second version of the updating agent 162. The updating agent 110 requests a second version of source files 165 from node 170A (block 305). Node 170A receives the request for the source files 165 (block 310) and sends the source files 165 to the updating agent 110 on server 105 (block 315). The updating agent 110 downloads the second version of source files 165 into a temporary location within the server 105 (block 320). Next, the updating agent 110 overwrites the first version of the source files 115A with the second version of the source files 165, where the overwritten first version of the source files become a third version of the source files (e.g., the updated source files 115B) (block 325). In this example, the updated source files 115B are identical to the source files 165 from the repository 160.

Next, the updating agent 110 restarts with an update parameter (block 330). For example, after being updated, an updating agent 110 may re-start with a command line flag (i.e., update parameter) indicating that the updating agent 110 has been updated. In some implementations, an update parameter may include a location of a downloaded copy of the source files 165. For example, an update parameter may be a variable including a full path of a temporary directory where the source files 165 are located. In certain implementations, an update parameter may be an existence of a sentinel file generated on the server 105. For example, a sentinel file may be a file generated after certain operations have completed (e.g., after an updating agent 110 has been updated). In this example, an updating agent 110 may check for an existence of the sentinel file at a specific location on the server 105. In this case, if the sentinel file does not exist, the updating agent 110 has not yet been updated. In other instances, an update parameter may be the existence of the source files 165 on the server 105. In some instances, an update parameter may be a local or global environment variable. Upon re-starting, the updating agent 110 determines whether the second version of the source files 165 are identical to the third version of the source files (e.g., update source files 115B) (block 335). For example, determining whether two versions of source files (e.g., updated source files 115B and source files 165) are identical may include comparing version numbers of each respective set of source files. In some implementations, source files (e.g., source files 115B and source files 165) may include a version number within one or more of the source files. For example, a sentinel file included both source files 115B and source files 165 may be used to verify whether or not the source files 115B and 165 are identical. If the third version of the source files 115B and the second versions of the source files 165 are identical, the updating agent 110 continues executing and starts updating the application 117. If the third version of the source files 115B and the second versions of the source files 165 do not match, the updating agent 110 may output an error and stop executing. In some implementations, an error may be output to an error log.

As shown in FIG. 3, the updating agent 110 then requests updates for application 117 (e.g., a web server) from node 170A (block 340). The node 170A receives the request (block 345) and sends the requested updates (e.g., libraries 168 including updated and/or additional functionality associated with the web server), or links to the requested updates, to the updating agent 110 (block 350). The updating agent 110 downloads the updates from the repository 160 on the node 170A (block 355) and updates the application 117 (block 360). Thus, the application 117 (e.g., a web server) is updated to a latest version without having to determine whether the updating agent 110 is capable of upgrading the application 117.

Figure 4:
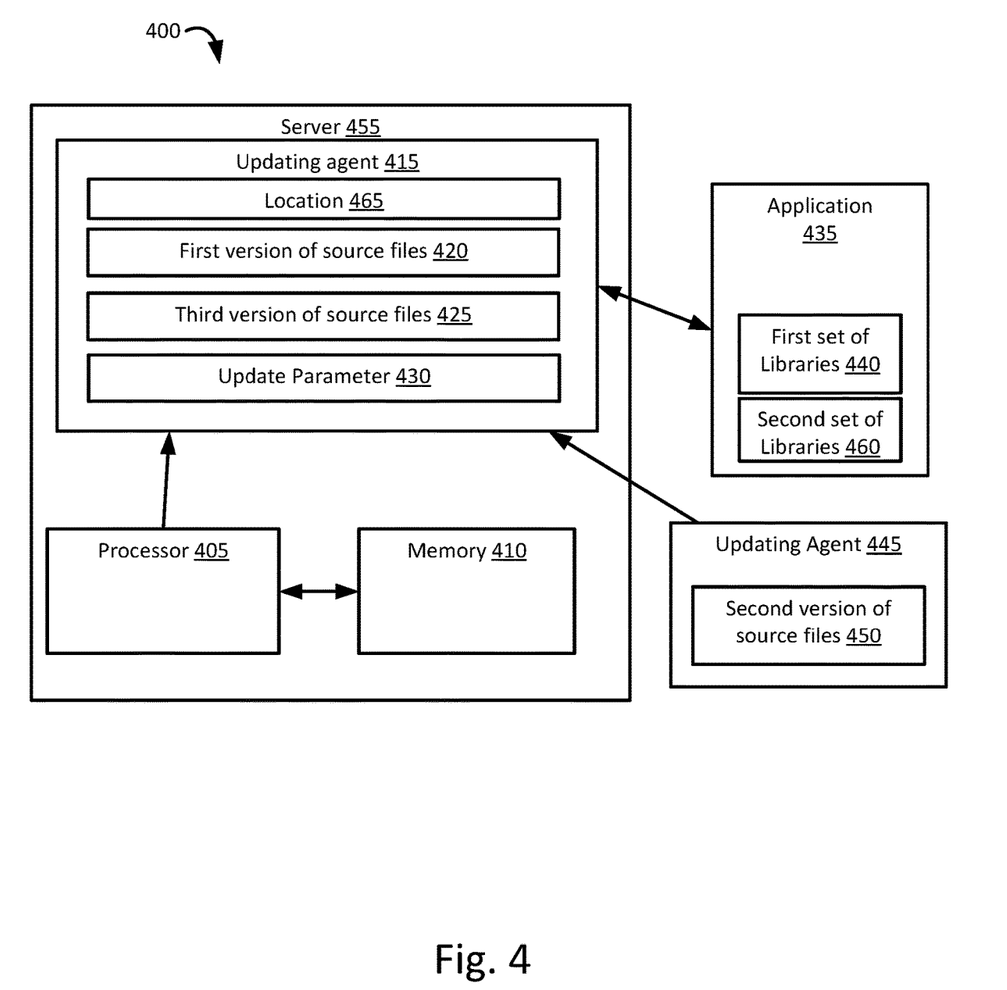
FIG. 4 illustrates a block diagram of an example system where an update agent updates itself according to an example embodiment of the present disclosure.

FIG. 4 is a block diagram of system 400, which comprises a server including a memory 410 and a processor 405. The processor 405 is in communication with the memory 410, the updating agent 415 comprises a first version of source files 420, and the updating agent 415 is operable to update a first set of libraries 440 of an application 435 and the updating agent 415. The processor 405 is configured to download, by the updating agent 415, a second version of source files 450 associated with a second version of the updating agent 445, where the second version of source files 450 are stored separately from the first version of the source files 420. The second version of the updating agent 445 is operable to update a second set of libraries 460 of the application 435. The first version of the source files 420 is overwritten by the updating agent 415 with the second version of the source files 450, where the overwritten first version of the source files 420 becomes a third version of the source files 430 which is identical to the second version of the source files 450. The updating agent 415 re-starts the updating agent 415 with an update parameter 430 designating a location 465 of the downloaded second version of the source files 450, where the third version of the source files 425 are executed to re-start the updating agent 415.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system, comprising:
a server comprising a memory and a processor, wherein the processor is in communication with the memory, the server comprises an updating agent executing on the server and an application executing on the server separately from the updating agent, the updating agent comprises a first version of source files, and the updating agent has a first functionality which is operable to update a first set of libraries of the application and the updating agent, and the application has a second functionality different from the first functionality,
wherein the processor is configured to:
download, by the updating agent after determining that the updating agent is not up to date with a latest version of the updating agent, a second version of source files associated with a second version of the updating agent, wherein the second version of source files are stored separately from the first version of the source files, wherein the second version of the updating agent is operable to update a second set of libraries of the application;
overwrite, by the updating agent, the first version of the source files with the second version of the source files, wherein the overwritten first version of the source files becomes a third version of the source files which is identical to the second version of the source files; and
re-start the updating agent, by the updating agent, with an update parameter designating a location of the downloaded second version of the source files and indicating that the updating agent has been updated, wherein the third version of the source files are executed to re-start the updating agent.

2. The system of claim 1, wherein the processor is further configured to:
in response to re-starting the updating agent with the update parameter, determine whether the second version of the source files are identical to the third version of the source files; and
in response to determining the second version of the source files are identical to the third version of the source files, update the one or more libraries.

3. The system of claim 1, wherein the processor is further configured to:
in response to starting the updating agent with the update parameter, determine whether the second version of the source files are identical to the third version of the source files; and
in response to determining the second version of the source files are not identical to the third version of the source files, stop execution of the updating agent.

4. The system of claim 1, wherein starting the updating agent with the update parameter indicates that the updating agent has executed instructions to replace the first version of the source files with the second version of the source files.

5. The system of claim 1, wherein the second version of source files are retrieved from a source file repository external to a location of the update agent comprising the first version of source files.

6. The system of claim 1, wherein the second version of the updating agent associated with the second version of the source files is a latest version of the updating agent comprising a first version of source files.

7. The system of claim 1, wherein the second set of libraries includes the first set of libraries.

8. The system of claim 1, wherein the second set of libraries omits the first set of libraries.

9. The system of claim 1, wherein the second set of libraries includes a subset of the first set of libraries.

10. A method, comprising:
downloading, by an updating agent comprising a first version of source files, after determining that the updating agent is not up to date with a latest version of the updating agent, a second version of source files associated with a second version of the updating agent, wherein the updating agent executes on a server, the second version of source files are stored separately from the first version of the source files, the updating agent has a first functionality which is operable to update a first set of libraries of an application and the updating agent, the application executing on the server separately from the updating agent, the second version of the updating agent is operable to update a second set of libraries of the application, and the application has a second functionality different from the first functionality;
overwriting, by the updating agent, the first version of the source files with the second version of the source files, wherein the overwritten first version of the source files becomes a third version of the source files which is identical to the second version of the source files; and
re-starting the updating agent, by the updating agent, with an update parameter designating a location of the downloaded second version of the source files and indicating that the updating agent has been updated, wherein the third version of the source files are executed to re-start the updating agent.

11. The method of claim 10, further comprising:
in response to re-starting the updating agent with the update parameter, determining whether the second version of the source files are identical to the third version of the source files; and
in response to determining the second version of the source files are identical to the third version of the source files, updating the one or more libraries.

12. The method of claim 10, further comprising:
in response to starting the updating agent with the update parameter, determining whether the second version of the source files are identical to the third version of the source files; and
in response to determining the second version of the source files are not identical to the third version of the source files, stopping execution of the updating agent.

13. The method of claim 10, wherein starting the updating agent with the update parameter indicates that the updating agent has executed instructions to replace the first version of the source files with the second version of the source files.

14. The method of claim 10, wherein the second version of source files are retrieved from a source file repository external to a location of the update agent comprising the first version of source files.

15. A non-transitory machine readable medium storing code, which when executed by a processor is configured to:
download, by an updating agent comprising a first version of source files after determining that the updating agent is not up to date with a latest version of the updating agent, a second version of source files associated with a second version of the updating agent, wherein the updating agent executes on a server, the second version of source files are stored separately from the first version of the source files, the updating agent has a first functionality which is operable to update a first set of libraries of an application and the updating agent, the application executing on the server separately from the updating agent, and the second version of the updating agent is operable to update a second set of libraries of the application, and the application has a second functionality different from the first functionality;

overwrite, by the updating agent, the first version of the source files with the second version of the source files, wherein the overwritten first version of the source files becomes a third version of the source files which is identical to the second version of the source files; and re-start the updating agent, by the updating agent, with a signal indicating the overwrite is complete and designating a location of the downloaded second version of the source files, wherein the third version of the source files are executed to re-start the updating agent.

16. The non-transitory machine readable medium of claim 15, wherein the signal is a command line parameter designating a location of the downloaded second version of the source files.

17. The non-transitory machine readable medium of claim 15, wherein the signal is a sentinel file generated and placed with the third version of the source files.

18. The non-transitory machine readable medium of claim 15, wherein the signal is an environment variable.

19. The non-transitory machine readable medium of claim 15, wherein the code, when executed by the processor, is further configured to:

in response to re-starting the updating agent with the update parameter, determining whether the second version of the source files are identical to the third version of the source files; and in response to determining the second version of the source files are identical to the third version of the source files, updating the one or more libraries.

20. The non-transitory machine readable medium of claim 15, wherein the code, when executed by the processor, is further configured to:

in response to starting the updating agent with the update parameter, determining whether the second version of the source files are identical to the third version of the source files; and in response to determining the second version of the source files are not identical to the third version of the source files, stopping execution of the updating agent.

* * * * *